United States Patent Office 3,152,164
Patented Oct. 6, 1964

3,152,164
NOVEL CYCLIC PHOSPHITE ESTERS AND PROCESS INVOLVING TRANSESTERIFICATION OF A PHOSPHITE DIESTER WITH A GLYCOL
Alexis A. Oswald, Sarnia, Lambton, Ontario, Canada, assignor to Esso Research and Engineering Company, a corporation of Delaware
No Drawing. Filed Apr. 29, 1959, Ser. No. 809,610
11 Claims. (Cl. 260—461)

The present invention relates to new compositions of matter and to methods of preparation of these new compositions of matter. More particularly, this invention relates to the synthesis of cyclic organic phosphorus compounds by transesterification of dialkyl hydrogen phosphites or trialkyl phosphites with 1,2- and 1,3-glycols. Most particularly, this invention relates to the preparation of cyclic hydrogen phosphites having 5 and 6 membered rings and of cyclic 2-chloroethyl phosphites also having 5 and 6 membered rings.

Over the prior art methods of preparation of cyclic hydrogen phosphites and neutral phosphite esters the present invention provides a simple process whereby high yields of the desired materials can be obtained. In the prior art processes, wherein for example direct esterification by heating phosphorus acids with the appropriate alcohol was attempted, many different compounds were formed with only small amounts of pure product of the type expected being isolated. Additionally, in the present method of preparation, the starting materials are easily prepared, for example the phosphorous acid esters being prepared from alcohols and phosphorus trichloride. Thus an efficient economical process is provided.

It has now been discovered that high yields of the present new compositions of matter can be obtained by transesterification of the following materials with 1,2- and 1,3-glycols;

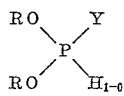

wherein Y is an oxygen atom or an OR radical, and where R is an alkyl or an aralkyl, or a halogenated alkyl or aralkyl radical. It should be noted that the above structural formula includes both dialkyl hydrogen phosphites and trialkyl phosphites. In the former case only a hydrogen atom is attached to the phosphorus atom while in the latter case none is present. Thus, in the formula the hydrogen atom is represented as $H_{1-0}$. It should be noted that in the case of hydrogen phosphites the above structure is in tautomeric equilibrium with another structure in which the phosphorus is trivalent:

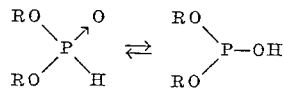

Thus according to the present invention the following reactions, for example, are carried out.

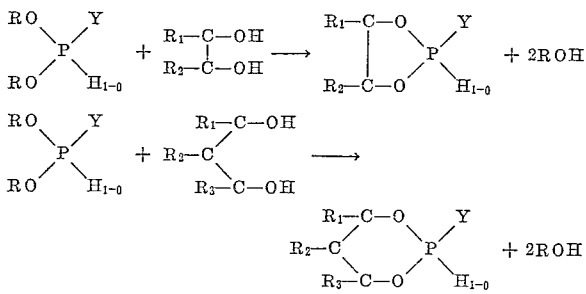

In these reactions in addition to the groups already identified above $R_1$, $R_2$ and $R_3$ are alkyl or aryl groups or halogen or hydrogen.

It should be noted again that the cyclic hydrogen phosphites can also tautomerize:

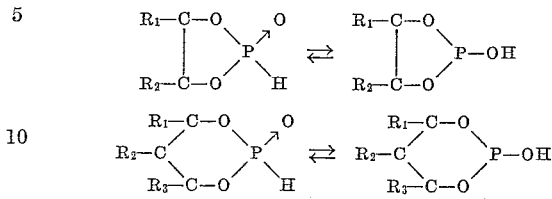

In the description of the present invention, the cyclic hydrogen phosphites are named after their structures with trivalent phosphorus; i.e. cyclic hydrogen phosphites with five membered ring are called 2-hydroxy-1,3, 2-dioxaphospholanes and those with six membered ring 2-hydroxy-1,3,2-dioxaphosphorinanes.

According to the present invention, preparation of cyclic hydrogen phosphites by transesterification is obtained by reacting for example, 1 mole of the glycol with one mole of the phosphorus material at temperatures of $-10°$ C. to $250°$ C., preferably $10°$ C. to $180°$ C. and at pressures of 1 mm. to 5 Atm., preferably 5 mm. to 1 Atm. It should be added that although 1 mole of glycol and 1 mole of phosphorous acid ester form 1 mole of the new cyclic ester, any of the two types of starting material may be added in excess to the reaction mixture. It is preferred, however, to utilize mole ratios of 0.7– 1.3 moles of the glycol per mole of the phosphorus material in the reaction. An inert organic diluent such as toluene or dioxane may be used. The reaction also can be carried out in the absence of any solvent. A basic or acidic transesterification catalyst such as sodium glycolate or trialkyl amines may be added to the reaction mixture. However, the addition of such a catalyst is not generally essential.

Preparation of cyclic phosphites by partial transesterification of alkyl phosphites preferably of tris-2-chloroethyl phosphite is obtained by reacting, for example, 1 mole of the phosphite material with 1 mole of the glycol at temperatures of $-20°$ C. to $250°$ C., preferably $0°$ C. to $180°$ C. and pressures of 1 mm. to 5 Atm. preferably 3 mm. to 1 Atm. in the presence or absence of an inert organic diluent such as toluene or dioxane. Again it should be noted that either of the reactants may be used in excess in the reaction. Preferred mole ratios of reactants are in the range of 0.7 to 1.3 moles of the glycol per mole of the phosphorus material.

In both of the transesterification reactions described above, i.e. the preparation of the cyclic hydrogen phosphites and the preparation of the cyclic phosphites it is preferred to increase the rate of reaction by continuously removing the alcohol formed in the reaction and thus drive the reaction in the desired direction.

Purification of both the hydrogen phosphite material and of the phosphite material may be obtained for example by distillation at reduced pressure. It is mentioned again that of course, either of the two types of starting materials may be added in excess of the equimolar quantity. Using such an excess the purification of the product may be more easily accomplished. Inert solvents, acidic or basic catalysts may be added to the reaction mixture but they are not essential.

The cyclic organic phosphorus compounds of this invention will be of particular advantage due to their increased thermal and hydrolytic stability as petroleum additives themselves or can be used as starting materials for the preparation of additives. Thus, these 5 and 6 membered phosphorus ring compounds should be particularly stable. In connection with the use of these materials as intermediates to prepare particularly stable phosphorus additives the following reactions, for example, can be utilized. Thus, olefin addition to the cyclic hydrogen phosphites,

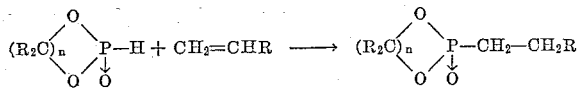

or Arbuzov rearrangement of the cyclic 2-chloroethyl-phosphites,

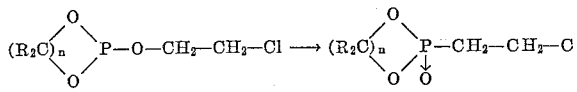

give cyclic phosphonates in which there is not any open chain ester grouping.

In the present invention, the new compositions of matter were proven by unequivocal synthesis of these materials according to prior art methods. It was found that the physical properties of these materials matched the new composition of matter materials of this invention. Data on the preparation according to the present invention, and according to the prior art methods is represented in the following examples.

(I) EXAMPLES FOR THE PREPARATION OF CYCLIC HYDROGEN PHOSPHITES

(A) Transesterification

EXAMPLE 1

A mixture of 18 grams (0.2 mol) 2,3-butanediol and 27.6 grams (0.2 mol) diethyl hydrogen phosphite was placed in a round bottom flask connected to a distilling head fitted with a downward condenser and a receiver for vacuum distillation. The resulting solution was heated to 130° C. at 120 mm. pressure under nitrogen. The reaction proceeded as shown by the distillation of ethanol. When the ethanol evolution ceased the remaining crude product was purified by fractional distillation in vacuo. Between 84–85° C. at 2.3 mm. pressure 20.4 grams i.e. a yield of 75% 2-hydroxy-4,5-dimethyl-1,3,2-dioxaphospholane (2,3-butylene hydrogen phosphite) was obtained. The product was a liquid with a refractive index, $n_D^{20}$ 1.4616. An analysis revealed a phosphorus content of 23.1%. The calculated phosphorus content for $C_4H_9O_3P$ is 22.8%.

EXAMPLE 2

When the procedure described in Example 1 was carried out with a mixture of 1,3-butanediol and diethyl hydrogen phosphite, 2-hydroxy-4-methyl-1,3,2-dioxaphosphorinane was obtained as the reaction product. It distilled between 103–104° C. at 2.3 mm., weighed 20.7 grams (i.e. 76%), and had $n_D^{20}$ 1.4547. An analysis of this product revealed 22.8% phosphorus. The calculated phosphorus content for $C_4H_9O_3P$ is also 22.8%.

EXAMPLE 3

A mixture of 16.7 grams (0.22 mol) of 1,2-propanediol (propylene glycol) and 27.6 grams (0.2 mol) of diethyl hydrogen phosphite were heated in a vacuum distillation apparatus to 140° C. under nitrogen atmosphere. The pressure was then reduced to 140 mm. and kept there until the end of the ethanol evolution. Then the heating was discontinued and the pressure was slowly decreased to 2.3 mm. Under that pressure between 85–86° C. 19 grams i.e. a yield of 78% of 2-hydroxy-4-methyl-1,3,2-dioxaphospholane (propylene hydrogen phosphite) distillate was received as a colorless liquid, $n_D^{20}$ 1.4580. An analysis of the product revealed 23.9% phosphorus. The calculated phosphorus content for $C_3H_7O_3P$ is 25.4%.

EXAMPLE 4

A reaction between 1,3-propanediol and diethyl hydrogen phosphite in the manner described above gave 19.3 grams (i.e. 79%) 2-hydroxy-1,3,2-dioxaphosphorinane (trimethylene hydrogen phosphite), B.P. 97–98° C. at 2.5 mm. $n_D^{20}$ 1.4522. The phosphorus content found was 24.9%. The theoretical value for $C_3H_7O_3P$ is 25.4%.

EXAMPLE 5

A solution of 20.8 grams (0.2 mol) of 2,2-dimethyl-1,3-propanediol and 27.6 grams (0.2 mol) of diethyl hydrogen phosphite in 50 mls. of chlorobenzene is refluxed at 140° C. under nitrogen while ethanol is distilling and taken off continuously. When the ethanol evolution is finished, the remaining mixture is distilled under reduced pressure. After the removal of the chlorobenzene, 25.8 grams, i.e. a yield of 85% 2-hydroxy-5,5-dimethyl-1,3,2-dioxaphosphorinane is distilled between 103–104° C. at 2.5 mm. This product solidifies to a white solid, which melts between 53–55° C. and has a phosphorus content of 20.2%. The calculated phosphorus value for $C_5H_{11}O_3P$ is 20.6%.

EXAMPLE 6

A solution of 29.2 grams (0.2 mol) of 2-ethyl-1,3-hexanediol and 27.6 grams (0.2 mol) of diethyl hydrogen phosphite in 75 mls. of toluene is placed into a 250 mls. round bottom flask equipped with a distillation head (with reflux) fitted with a condenser. At first 0.23 gram (0.01 mol) of sodium is dissolved in the mixture thereby forming a basic catalyst. Then the reaction mixture is refluxed and the ethanol evolved is distilled off. After the reaction is finished, the toluene solution of the raw product is fractionally distilled. Between 117–118° C. under 2.5 mm. pressure 30 grams, i.e. a yield of 78% 2 - hydroxy-4-propyl-5-ethyl-1,3,2-dioxaphosphorinane is obtained. The purified product has a refractive index, $n_D^{20}$ 1.4600 and a phosphorus content of 16.3%. The latter is in good agreement with the calculated value for $C_8H_{17}O_3P$, 16.1%.

EXAMPLE 7

Transesterification of diethyl hydrogen phosphite with 3-chloro-1,2-propanediol (glyceryl α-chlorohydrin) in the manner described in Example 1 resulted in 83% yield of 2-hydroxy-4-chloromethyl - 1,3,2 - dioxapholane (3-chloropropylene hydrogen phosphite) distilling between 125–126° C. at 2.3 mm. The analysis of the product obtained revealed a phosphorus content of 19.7%. The calculated value for $C_3H_6ClO_3P$ is 19.8%. The refractive index, $n_D^{20}$ 1.4910 is in fair agreement with the value ($n_D^{20}$ 1.4898) obtained previously on the same composition which was prepared by another method (A. E. Arbuzov, V. M. Zoroastrova, Izvest. Akad. Nauk. S.S.S.R. Otdel, Khim. Nauk. 208 (1948)).

EXAMPLE 8

24.8 grams (0.4 mol) of ethylene glycol was transesterified with 55.2 grams (0.4 mol) diethyl hydrogen phosphite, according to the procedure described in Example 1. After the end of the usual ethanol evolution, however, not all of the raw product could be distilled. A residue remained, which weighed 18 grams. This means a yield of 42% as calculated for ethylene hydrogen phosphite. This material is apparently polymeric and contains the following polymer unit:

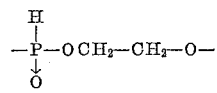

A distillate was also obtained between 117–118° C. at 2.3 mm. It was a colorless liquid, $n_D^{20}$ 1.4751, and weighed 24.2 grams (i.e. a yield of 56% as calculated for ethylene hydrogen phosphite). An analysis revealed 28.2% phosphorus in this product; the calculated phosphorus content is 28.7%.

The high boiling point, however, indicated that the product has a higher molecular weight than a compound of the following formula:

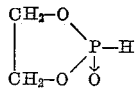

A literature search revealed that a so-called cyclic secondary diphosphite;

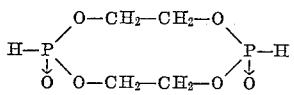

is formed by reacting phosphorus trichloride with ethylene glycol (H. G. Cooke, J. D. Ilett, B. C. Saunders, G. J. Stacey, H. G. Watson, J. G. E. Wilding, S. J. Woodcock, J. Chem. Soc. 2921 (1949)). The reported boiling point for this diphosphite is 99.5° C. at 0.15 mm. It is probable that the transesterification product of B.P. 117–118° C. at 2.3 mm. is identical with this diphosphite.

(B) *Prior Art Unequivocal Synthesis of the Cyclic Hydrogen Phosphites*

(1) *Preparation of cyclic chlorophosphites.*—To a solution of phosphorus trichloride (68.7 grams, 0.5 mol) in anhydrous ether (200 mls.) a mixture of 2,3- or 1,3-butanediol (45 grams, 0.5 mol), pyridine (79 grams, 1 mol) and ether (200 mls.) was added with vigorous stirring while the temperature was kept below —5° C. The precipitated pyridinium chloride was removed by filtration and washed with ether. The combined clear filtrate was fractionated. After the removal of the ether, the cyclic chlorophosphites were distilled in vacuum and were obtained as colorless liquids.

Starting from 2,3-butanediol 67 grams (87%) 2-chloro-4,5-dimethyl-1,3,2-dioxaphospholane boiling at 54–56° C. at 10 mm. was obtained. The refractive index was $n_D^{20}$ 1.4700. Lucas and co-workers (F. W. Mitchell, Jr., and C. N. Scully, J. Am. Chem. Soc., 72, 5491 (1930)) obtained apparently the same product without an acid binding agent. It had a B.P. of 66° C. at 15 mm. and a refractive index of $n_D^{25}$ 1.4696.

Using 1,3-butanediol, the method gave 69.5 grams, i.e. 89% 2-chloro-4-methyl-1,3,2-dioxaphosphorinane boiling at 55–57° C. at 10 mm. The refractive index was $n_D^{20}$ 1.4670. Arbuzov and Zoroastrova (Izvest. Akad. Nauk. S.S.S.R. Otdel. Khim. Nauk. 208 (1948)) reported B.P. 65° C. at 12 mm. and $n_D^{20}$ 1.4700. Lucas and co-workers (see previous reference) gave B.P. 66.6–67.5° C. at 15 mm. and $n_D^{25}$ 1.4884.

(2) *Synthesis of cyclic hydrogen phosphites by the hydrolysis of cyclic chlorophosphites.*—To a mixture of water (3.6 grams, 0.2 mol) and benzene (100 mls.), the solution of the chlorophosphite (0.2 mol) in benzene (250 mls.) was added while shaking. The reaction mixture was then stirred for one-half hour. The resultant clear, homogeneous solution was fractionated in vacuum, when the benzene solvent was removed at first under 160 mm. pressure. The raw product was then distilled at 2 mm. of mercury.

2-chloro - 4,5 - dimethyl - 1,3,2 - phospholane gave 26 grams, i.e. a yield of 95% 2-hydroxy-4,5-dimethyl-1,3,2-phospholane on hydrolysis. The product was obtained between 81–83° C. at 2 mm. and had a refractive index, $n_D^{20}$ 1.4610. Comparison of infrared spectra showed identity with the 2,3-butanediol transesterification product.

Similarly, by the hydrolysis of 2-chloro-4-methyl-1,3,2-phosphorinane, this procedure resulted in the formation of 25 grams, i.e. a yield of 92% 2-hydroxy-4-methyl-1,3,2-dioxaphosphorinane obtained as a colorless liquid between 101–102° C. at 2 mm. The refractive index is $n_D^{20}$ 1.4528. Although this product was a mobile liquid after distillation, it became quite viscous after a few days and was similar to the transesterification product with 1,3-butanediol. The identity of the two products was then proven by comparison of their infrared spectra.

(II) EXAMPLES FOR THE PREPARATION OF CYCLIC 2-CHLOROETHYL PHOSPHITES (A) *Transesterification*

EXAMPLE 9

A heterogeneous mixture of 18 grams (0.2 mol) of 2,3-butanediol and 53.9 grams (0.2 mol) of tris-2-chloroethyl phosphite was placed into a 150 mls. round bottom flask. Then the mixture was heated on a steam bath after which it became homogeneous within five minutes. Then the flask was connected with a Claisen head, downward condenser and a receiver for vacuum distillation. The apparatus was placed under a nitrogen pressure of 18 mm. The evolution of ethylene chlorohydrin, by product of transesterification, started after 5 minutes heating and was complete in an hour. The colorless crude product was fractionated at 3 mm. pressure in nitrogen and gave a yield of 27.8 grams, i.e. 70% 2-β-chloroethyl-4,5-dimethyl-dioxaphospholane as a colorless liquid, $n_D^{20}$ 1.4650, distilling between 107–109° C. An analysis revealed 17.90% chlorine in this product, which can be compared with 17.88% chlorine calculated for $C_4H_{12}ClO_3P$

EXAMPLE 10

When 1,3-butanediol was used for the transesterification in the manner described in Example 1, 2-β-chloroethyl-4-methyl-1,3,2-dioxaphosphorinane was obtained in 75% yield. This product distilled between 98–100° C. at 2.5 mm. pressure, had a refractive index, $n_D^{20}$ 1.4680 and a phosphorus content of 18.30%. The phosorus calculated for $C_4H_{12}ClO_3P$ is 17.88%.

EXAMPLE 11

A solution of 23.6 grams (0.2 mol) 2-methyl-2,4-pentanediol and 56.6 grams (0.21 mol) tris-2-chloroethyl phosphite in 100 mls. mesitylene is heated at 90° C. Ethylene chlorohydrin is evolved and can be distilled off at 20 mm. pressure. After the ethylene chlorohydrin evolution has ceased, the pressure is reduced to 10 mm. and the mesitylene is removed. Then the raw product is distilled at 2 mm. At that pressure, 2-β-chloroethyl-4,4-dimethyl-6-methyl-1,3,2-dioxaphosporinane is distilled between 105–107° C. and can be obtained as a colorless liquid, $n_D^{20}$ 1.4534 in 80% yield (i.e. 36.2 grams). An analysis of the product reveals 16.05% chlorine. The calculated chlorine content for $C_8H_{14}ClO_3P$ is 15.67%.

EXAMPLE 12

The transesterification of 53.9 grams (0.2 mol) of tris-2-chloroethyl phosphite with 22 grams (0.2 mol) of catechol in the manner described in Example 1 gave 37.2 grams, i.e. a yield of 85% catechyl 2-chloroethyl phosphite distilling between 82–84° C. at 2 mm. This product had a refractive index, $n_D^{20}$ 1.5390 and a phosphorus content of 16.50%. The calculated phosphorus value for $C_8H_8ClO_3P$ is 16.24%. Catechyl 2-chloroethyl phosphite was prepared previously (M. J. Kabachnik, Izvest. Akad. Nauk. S.S.S.R. Otdel. Khim. Nauk. 631 (1947)) and was reported to boil between 107–108° C. at 2.5 mm. and to have a refractive index, $n_D^{20}$ 1.5430.

EXAMPLE 13

When 53.9 grams (0.2 mol) of tris-2-chloroethyl phosphite was transesterified with 12.4 grams (0.2 mol) of ethylene glycol, most of the product was apparently a polymeric distillation residue (26.3 grams, i.e. a yield of 77% as calculated for ethylene chloroethyl phosphite). Such a product probably contains the following polymer unit:

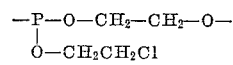

A smaller yield, 6.8 grams, i.e. 20% of a liquid distillate was also obtained between 108–110° C. at 2 mm. This product had a refractive index, $n_D^{20}$ 1.4898 and a phosphorus content of 19.85%. The calculated phosphorus content for ethylene chloroethyl phosphite, $$C_4H_8ClO_3P$$

is 20.82%.

This distillate is apparently not monomeric ethylene 2-chloroethyl phosphite, which was reported (A. E. Arbuzov, V. M. Zoroastrova, Izvest. Akad. Nauk. S.S.S.R. Otdel. Khim. 208 (1948)) to have a boiling point between 78.5–79.5° C. at 65 mm. and a refractive index, $n_D^{20}$ 1.4898. It is believed that the present composition can be characterized by the following diphosphite structure:

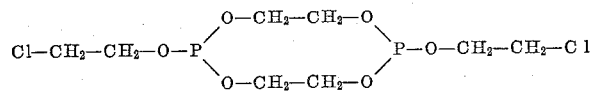

(B) *Prior Art Unequivocal Synthesis of Cyclic 2-Chloroethyl Phosphites From Cyclic Chlorophosphites*

To a solution of the cyclic chlorophosphite (30.9 grams, 0.2 mol 2-chloro-4,5-dimethyl-1,3,2,-dioxaphospholane and 2-chloro-4-methyl-1,3,2-dioxaphosphorinane, respectively) in 200 mls. ether 16.1 grams (0.2 mol) ethylene chlorohydrin and subsequently 15.8 grams (0.2 mol) pyridine were added dropwise with stirring at 0° C. or lower. After the addition, the reaction mixture was allowed to come to room temperature with continued stirring. Pyridinium chloride was removed by filtration and the filtrate was fractionated.

In this manner, beginning with 2-chloro-4,5-dimethyl-1,3,2-dioxaphospholane between 56–60° C. at 1 mm., 31 grams (79%) 2-β-chloroethyl-4,5-dimethyl-1,3,2-dioxaphospholane (2,3-butylene-2-chloroethyl phosphite) was obtained, $n_D^{20}$ 1.4659. The spectra of this compound was identical with the product of transesterification reported in Example 1.

Using the same method, 2-chloro-4-methyl-1,3,2-dioxaphosphorinane gave 33 grams i.e. a yield of 86% 2-β-chloroethyl-4-methyl-1,3,2-dioxaphosphorinane which distilled between 54–56° C. at 1 mm. and had a refractive index of $n_D^{20}$ 1.4697. This compound had an identical spectra with the corresponding transesterification product reported in Example 2.

What is claimed is:

1. An improved process for the preparation of a cyclic hydrogen phosphite which comprises reacting a material selected from the group consisting of a dialkyl hydrogen phosphite, a diaryl hydrogen phosphite and an alkyl aryl hydrogen phosphite with a material selected from the group consisting of 1,2-glycol, 1,3-glycol, vicinal glycol and α,ω-glycol at a temperature of from 10° C. to 180° C. and a pressure of from 1 mm. Hg to 5 atmospheres, in the absence of a catalyst, and removing the alcohol formed during the reaction.

2. The process of claim 1 in which the glycol is a 1,2-glycol.

3. The process of claim 1 in which the glycol is a 1,3-glycol.

4. The process of claim 1 in which the glycol is a vicinal glycol.

5. The process of claim 1 in which the glycol is an α,ω-glycol.

6. The process of claim 1 in which the pressures are in the range of 5 mm. to 1 atmosphere.

7. 2-hydroxy-5-propyl-5-ethyl-1,3,2-dioxaphosphorinane.

8. A linear polymer of ethylene hydrogen phosphite containing the following polymer units:

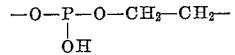

9. 2-β-chloroethyl-4,4-dimethyl-6-methyl-1,3,2-dioxaphosphorinane.

10. A cyclic diphosphite of the formula

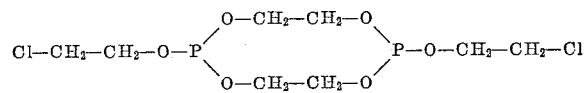

11. An improved process for the preparation of a cyclic 2-chloroethyl phosphite which comprises reacting tris-2-chloroethyl phosphite with a glycol at a temperature of from 0° C. to 180° C. and a pressure of from 3 mm. Hg to 1 atmosphere, in the absence of a catalyst, and removing the ethylene chlorohydrin formed during the reaction.

References Cited in the file of this patent

UNITED STATES PATENTS

| | | |
|---|---|---|
| 2,353,558 | Gzemski | July 11, 1944 |
| 2,728,790 | Sroog | Dec. 27, 1955 |
| 2,834,798 | Hechenbleikner et al. | May 13, 1958 |
| 2,893,961 | McManimie | July 7, 1959 |
| 2,916,508 | McConnell | Dec. 8, 1959 |

OTHER REFERENCES

Ayres et al.: "J. Chem. Soc." (1957), pp. 1109–1114.

Arbuzov et al.: "Chem. Abst.," vol. 50, column 13735 (1956).

Arbuzov et al.: "Chem. Abst.," vol. 52, columns 242–243, Jan. 10, 1958.

Lucas et al.: "J. Am. Chem. Soc.," vol. 72, pp. 5491–5497 (1950).